(12) United States Patent
Bacher et al.

(10) Patent No.: US 7,137,802 B2
(45) Date of Patent: Nov. 21, 2006

(54) APPARATUS FOR PROCESSING THERMOPLASTIC SYNTHETIC PLASTIC MATERIAL

(75) Inventors: Helmut Bacher, St. Florian (AT); Helmuth Schulz, Linz (AT); Georg Wendelin, Linz (AT)

(73) Assignee: Erema Engineering Recycling und Anlagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 10/517,014

(22) PCT Filed: Jan. 7, 2003

(86) PCT No.: PCT/AT03/00002

§ 371 (c)(1),
(2), (4) Date: Dec. 6, 2004

(87) PCT Pub. No.: WO03/103915

PCT Pub. Date: Dec. 18, 2003

(65) Prior Publication Data

US 2005/0287237 A1 Dec. 29, 2005

(30) Foreign Application Priority Data

Jun. 5, 2002 (AT) .............................. A 855/2002

(51) Int. Cl.
*A21C 11/10* (2006.01)

(52) U.S. Cl. .......................... 425/217; 264/140; 264/8; 366/145; 366/91

(58) Field of Classification Search ................ 264/140, 264/8; 366/76.4, 192, 144, 147, 145, 91; 241/15, 17, 19, 20, 186.3, 101.2; 425/217
See application file for complete search history.

(56) References Cited

U.S. PATENT DOCUMENTS 3,685,748 A 8/1972 Beck et al.

(Continued)

FOREIGN PATENT DOCUMENTS

EP 0578603 A1 1/1994

(Continued)

*Primary Examiner*—Joseph S. Del Sole
*Assistant Examiner*—Maria Veronica Ewald
(74) *Attorney, Agent, or Firm*—Townsend and Townsend and Crew LLP

(57) ABSTRACT

An apparatus for processing thermoplastic synthetic plastic material to be recycled comprises a first receptacle (1) and a second receptacle (2) for the material to be processed. Within both receptacles (1, 2) tools (21) for mixing and heating the material circulate around a vertical axis each. The material reaches the second receptacle (2) which is connected to an evacuating means (9), from the first receptacle (1) through a connecting conduit (3). The first receptacle (1) has above it an intake opening (19) for the material to be processed, and the mouth of the connecting conduit (3) in the second receptacle (2) is disposed at a higher level than the tools (21) circulating in this receptacle (2). The material processed is carried off the second receptacle (2) through a discharge opening (49) by means of at least one screw (47), whereby this receptacle is vacuum-tightly closed. A sluice (6) is connected to the intake opening (19) of the first receptacle (1) that also is connected to an evacuating means (9). In both receptacles (1, 2) at least two tools (21) each circulate in different levels, disposed one upon the other, wherein the intake opening (19) in the first receptacle (1) is disposed higher than the uppermost tools (21) circulating in this receptacle (1). The discharge opening (49) of the second receptacle (2) is disposed at least substantially at the level of the lowermost tools (21) circulating in this receptacle (2). In each one of the two receptacles (1, 2) at least one temperature sensor (32) is provided for each plane of the circulating tools (21), which sensor is disposed higher than its associated plane.

14 Claims, 1 Drawing Sheet

U.S. PATENT DOCUMENTS

| | | | |
|---|---|---|---|
| 5,110,055 A * | 5/1992 | Teeny | 241/15 |
| 5,536,154 A | 7/1996 | Bacher et al. | |
| 6,149,012 A | 11/2000 | Bennett et al. | |
| 6,422,732 B1 * | 7/2002 | Maris | 366/75 |

FOREIGN PATENT DOCUMENTS

| | | |
|---|---|---|
| EP | 0899071 A1 | 3/1999 |
| JP | 2001026019 A | 1/2001 |
| WO | WO 89/07042 A1 | 8/1989 |
| WO | WO 93/22119 A1 | 11/1993 |
| WO | WO 00/64654 A1 | 11/2000 |
| WO | WO 01/21372 A1 | 3/2001 |

\* cited by examiner

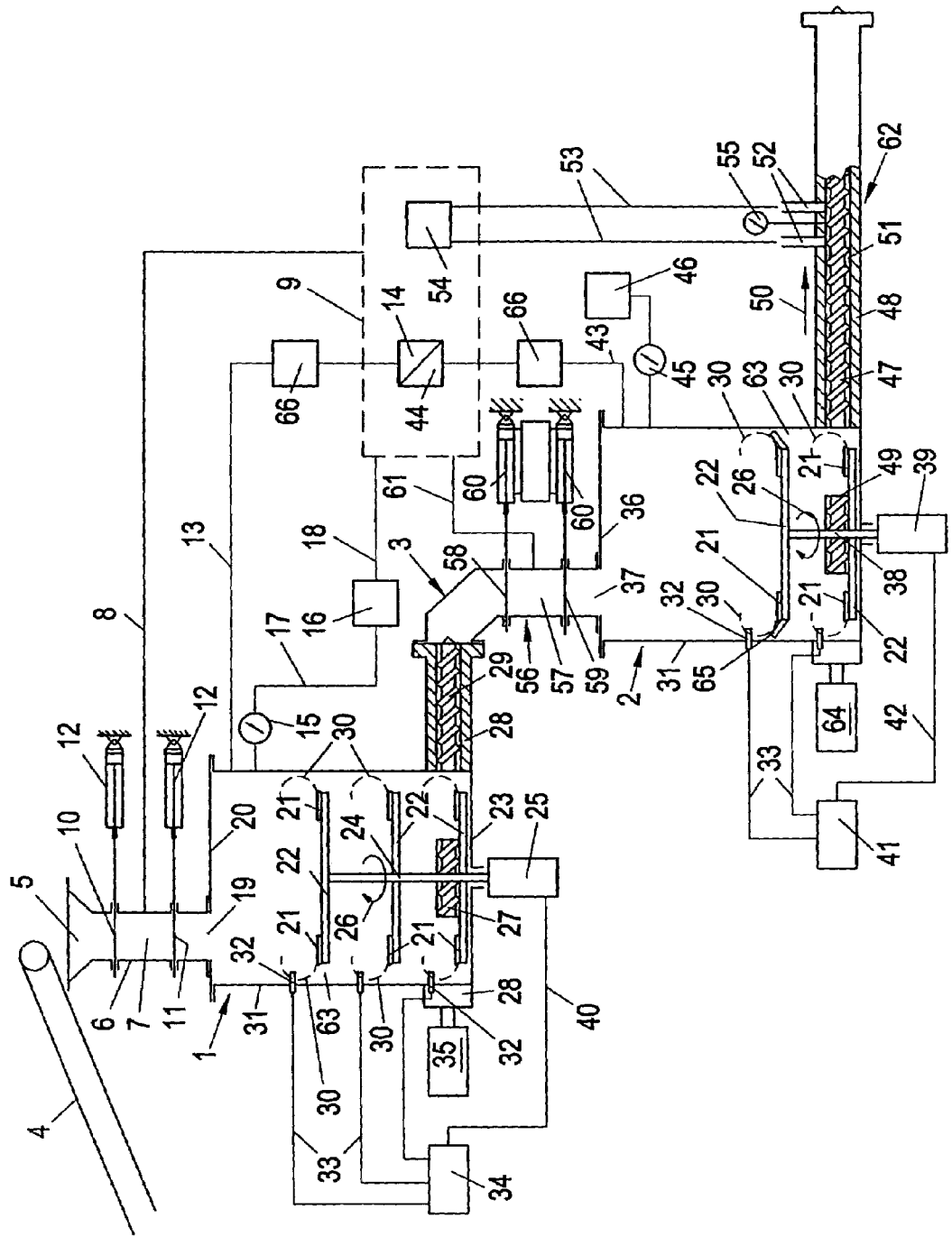

APPARATUS FOR PROCESSING THERMOPLASTIC SYNTHETIC PLASTIC MATERIAL

BACKGROUND OF THE INVENTION

The invention relates to an apparatus for processing thermoplastic synthetic plastic material that has to be recycled, comprising a first and a second receptacle for the material to be processed, in which receptacles tools circulating around vertical axes are provided for mixing and heating the material, wherein at least two tools each circulate in different levels one above the other and the material reaches the second receptacle that is connected to an evacuating means from the first receptacle through a connecting conduit, and wherein the first receptacle has above it an intake opening for the material to be processed, which intake opening is disposed at a higher level than the uppermost tools circulating in this receptacle and a discharge opening of the second receptacle is disposed at least substantially at the level of the lowermost tools circulating in this receptacle, and wherein the mouth of the connecting conduit in the second receptacle is disposed at a higher level than the tools circulating in this receptacle, and wherein the processed material is carried off the second receptacle through the discharge opening by means of at least one screw, whereby this receptacle is vacuum-tightly closed, and wherein the first receptacle is also connected to an evacuating means.

Such an apparatus is known from WO 01/21372 A1.

Another apparatus having also two receptacles through which the processed material runs in series is known from EP 632759 B1.

As a rule, such apparatus work sufficiently if the material to be processed does not make specific demands, in particular on sensitivity against air access and/or superheat and/or if a reduction of the molecule chain length should be avoided.

SUMMARY OF THE INVENTION

The invention has as an object to improve an apparatus of the initially described kind so that also sensitive material, in particular PET (Polyethylene-Terephtalate), can be gently and continuously processed without the danger that this material is damaged by too intensive heat influence. In particular, for PET it is desired to avoid a reduction of a IV-value (Intrinsic Viscosity), if possible even to increase this value which is equivalent to an increase of the stability of the products processed from the recycled synthetic plastic material.

The invention solves this task so that a sluice is connected to the intake opening of the first receptacle and so that in both receptacles the tools are fixed to disc-shaped tool carriers disposed one above the other, wherein in each one of the two receptacles at least one temperature sensor is provided for each level of the circulating tools, which sensor is disposed higher than the level associated to it. Thereby the synthetic plastic material to be recycled and supplied to the apparatus is continuously under vacuum from its introduction into the first receptacle until its conveying off the second receptacle by the screw, so that damaging atmospheric influences are avoided and the material is processed similarly to within an autoclave. By the tools circulating at different levels in each receptacle, for each receptacle a sufficient dwell-time of the material processed in the respective receptacle is obtained, which contributes substantially to obtaining a homogenous working up of the material. In the first receptacle, the material supplied through the sluice reaches the uppermost circulating tools from above and is taken along by these tools in a circulating motion around the receptacle axis in the form of a mixing cone. The material processed by the tools disposed above in the first receptacle reaches the region below these tools and is taken along by the tool disposed below and is circulated by this tool also in the form of a mixing cone. This is repeated, the more tool levels are provided in the respective receptacle. Since to each one of these levels a temperature sensor is associated which is disposed higher than the respective tool level, by a suitable control of the values given by the temperature sensors, overheating of the processed material and, therefore, a thermal damage of it can be avoided everywhere.

From the first receptacle, the processed material reaches the second receptacle through the connecting conduit and is supplied within this receptacle also from above onto the tools circulating in this receptacle. Processing by these tools in the second receptacle takes place in an analogous manner to that in the first receptacle; i.e. the material in the first instance is taken along by the uppermost tools and reaches the region of the tools disposed below. The thus completely homogenized material is finally pressed by the lowermost tools provided in the second receptacle into the exit opening of the second receptacle and is conveyed off by the screw connected to this opening. This screw acts vacuum-tightly, for example by compressing the material supplied to it so that the vacuum created within the second receptacle is maintained also when the processed material is conveyed off. At the inlet of the screw there is a completely homogenized material that is crystallized in the desired degree, although it is not at all thermally damaged. Surprisingly it has been shown that even an increase of the IV-value can be obtained so that products with the desired high stability can be produced from the so obtained recycled material.

By the disc-shaped tool carriers it is ensured that the processed material can sink down from above to below only through the annular gap between the edge of this tool carrier and the inner wall of the respective receptacle. This enhances maintaining the desired dwell-time for each single plastic particle within the respective receptacle.

According to a further embodiment of the invention the evacuating means is equipped for creating different vacuum conditions in the two receptacles, and a transition sluice is disposed within the connecting conduit. Thereby there is the possibility to process within the two receptacles with different vacua, without the pressure difference being impaired by conveying the processed material from the first receptacle into the second receptacle. Despite this vacuum sluice, a continuous processing manner is possible, since the sluice can be so operated that a continuous conveying off of the processed material from the first receptacle can be maintained and also a sufficient continuous supply into the second receptacle.

For maintaining the vacuum in the two receptacles a single vacuum pump may be sufficient. If different vacuum conditions in the two receptacles are desired, it is, however, more favorable if the evacuating means comprises at least one vacuum pump for each receptacle. Further it is suitable within the spirit of the invention that a control means for the vacuum within the respective receptacle is connected to each receptacle, which control means adjustably controls the vacuum in the respective receptacle so that in each receptacle the always desired vacuum can be obtained and can be maintained.

According to a preferred embodiment of the invention, the disc edge of at least one of these tool carriers is upwardly bent like a plate.

BRIEF DESCRIPTION OF THE DRAWINGS

Further features and advantages of the invention can be seen from the description of an exemplary embodiment schematically shown in the single drawing figure.

DESCRIPTION OF THE PREFERRED EMBODIMENTS

The apparatus shown in the drawing comprises two receptacles 1, 2 connected to each other by a connecting conduit 3. The supply of the thermoplastic synthetic plastic material to be processed, which frequently is PET (Polyethylene-Terephtalate), in particular in the form of milled material of bottles and bottle pre-forms, foils, fibers and the like, therefore mostly in pre-comminuted form, takes place by a conveyor belt 4 into a hopper 5, to the outlet end of which a sluice 6 is connected which can be designed as a vacuum sluice, whereby its interior 7 may be connected via a line 8 to an evacuating means 9. The sluice 6 has above and below it two vacuum-tight closing gates 10, 11 which can be shifted by double-acting cylinders 12 which suitably are hydraulically or pneumatically controlled. By this sluice 6 a sufficient vacuum can be maintained within the receptacle 1 also when the material to be recycled is continuously introduced, whereby the interior of the receptacle 1 is connected via a line 13 to a vacuum pump 14 of the evacuating means 9. This vacuum is continuously measured by a vacuum measuring device 15, and the measured values are fed via a line 17 to a control means 16 which is connected via a line 18 to the evacuating means 9 so that the evacuating means 9 provides continuously for the desired vacuum within the receptacle 1.

The outlet end of the sluice 6 is connected to an inlet opening 19 in the upper region or in the cover 20 of the receptacle 1 so that the introduced synthetic plastic material to be recycled falls from above onto tools 21 mounted on a tool carrier 22 which by means of a vertical shaft 24 vacuum-tightly intersecting the receptacle bottom 23 is driven for rotation around the axis of the shaft 24 in the direction of the arrow 26 by a motor 25. Similar tools 21 are mounted on further tool carriers 22 fixed spaced apart from each other to the shaft 24 below the uppermost tool carrier 22. The lowermost of these tool carriers 22 is disposed closely above the bottom 23 of the receptacle 1 so that the tools 21 carried by it are disposed at the level of a discharge opening 27 via which the housing 28 of a screw 29 is tangentially connected to the receptacle 1. This discharge opening 27 constitutes simultaneously the inlet opening of the screw housing 28. By this, the circulating tools 21 of the lowermost tool carrier 22 press the processed material into the volutions of the screw 29, by centrifugal action on one hand and in the manner of a spatula on the other hand, if the tools 21 are correspondingly disposed at the tool carrier 22.

The tools 21 of each one of the tool carriers 22 make the synthetic plastic material taken along by them circulate around the axis of the receptacle 1, whereby the material rises in the form of a mixing cone 30. Spaced apart above the tool carrier 22 a temperature sensor 32 is disposed in the region of the mixing cone at the side wall 31 of the receptacle 1. Each temperature sensor 32 is connected via a line 33 to a control means 34. This control means 34 controls via a line 40 the rotational speed of the motor 25 driving the tools 21 to their circulating motion so that any overheating of the material processed within the receptacle 1 is avoided.

The screw 29 driven by a motor 35 conveys the material processed within the receptacle 1 into the connecting conduit 3 which merges via an inlet opening 37 into the second receptacle 2, which opening is disposed in the cover 36 or in the upper region of the second receptacle 2. Within this receptacle 2 circulating tools 21 are mounted on tool carriers 22 in a similar manner as has been described in connection with the receptacle 1, which tool carriers are disposed below the inlet opening 37 and are driven for rotation via a shaft 38 by a motor 39. The speed of this motor 39 is also controlled by a control means 41 via a line 42 so that the temperature of the synthetic plastic material processed within the receptacle 2 sensed by temperature sensors 32 does not exceed predetermined set temperature values.

The tools 21 can also be driven from above. In such a case the motor 25 or 39, respectively, is disposed above the receptacle 1 or 2, respectively, and the shaft 24 or 38, respectively, intersects vacuum-tightly the cover 20 or 36, respectively.

The receptacle 2 can also be evacuated, and for this it is connected via a line 43 to a vacuum pump 44 of the evacuating means 9. Both receptacles 1, 2 can be evacuated by means of the same vacuum pump. In order to increase the versatility of the plant, however, it is to be preferred to provide separate vacuum pumps 14, 44 for the two receptacles 1, 2, because in such a manner different vacuum conditions can be obtained and maintained within the two receptacles 1, 2 in a simple manner. The pressure within the receptacle 2 is measured by means of a vacuum measuring device 45 and is indicated via a control means 46 to the evacuating means 9 so that there are always the desired vacuum conditions within the receptacle 2, in an analogous manner as this is within the receptacle 1.

From the receptacle 2, the processed synthetic plastic material is discharged by means of a screw 47, the housing 48 of which is connected via a discharge opening 49 to the receptacle 2 in a similar manner as has been described for the receptacle 1. This discharge opening 49 is disposed at the level of the tools 21 carried by the lowermost tool carrier 22 of the receptacle 2, so that filling of the screw 47 takes place in a similar manner as filling of the screw 29. The core diameter of the screw 47 increases in the direction of conveyance (arrow 50), so that the material supplied to the screw through the discharge opening 49 is at first compressed. Thereby, the screw 47 acts together with its housing 48 as a vacuum-tight closure of the receptacle 2. Following this zone of compression, the core diameter of the screw 47 decreases, so that a relaxing zone 51 for the material conveyed by the screw 47 is created. In this relaxing zone 51 at least one de-gassing opening 52 may intersect the screw housing 48. To the openings 52 lines 53 for conveying off the gases are connected. This conveying off of gas can be assisted by a vacuum pump 54 of the evacuating means 9. The vacuum created by the pump 54 can be controlled by means of a vacuum measuring device 55.

If desired, the vacuum pumps 14, 44, 54 can be distributed to different evacuating means 9. However, as a rule, the vacuum-creating members will be combined to one single evacuating means 9.

If different vacuum conditions are to be maintained within the two receptacles 1 and 2, and the screw 29 and its housing 28 do not constitute a vacuum-tight closure between the two receptacles 1, 2, it is suitable to provide a transfer sluice 56 in the connection conduit 3, the sluice chamber 57 of which is confined by two gates 58, 59 moved by cylinders 60 in an analogous manner as is the case for the sluice 6. Further, also the sluice chamber 57 of the transfer sluice 56 is connected via a line 61 to the evacuating means 9.

The screw 47 is driven by a motor 64 and suitably constitutes a member of an extruder 62 conveying the material supplied by the screw 47 in the form of strands to a granulating apparatus. This extruder 62 may be a double screw extruder. However, it is also possible that the screw 47 acts as a mere conveying screw only and feeds the material conveyed by it to further processing, for example (after plasticizing) to a mold device.

It is suitable to insert dust separators 66 into the lines 17, 43 via which evacuating of the receptacles 1, 2 takes place, which separators filter the dust from the air sucked off which is created by rubbing off when the synthetic plastic mass is processed within the receptacle 1 or 2, respectively.

By forming tool carriers 22 as discs having a circular cross-section, an annular gap 63 is created between the edge of each disc and the side wall 31 of the respective receptacle 1 or 2. Only through this annular gap the material can bypass the respective disc-shaped tool carrier 22 from above to below, which substantially contributes to ensure a sufficient dwell-time for each plastics particle within the respective receptacle 1 or 2. The arrangement of tool carriers 22 contributes to this, because each tool carrier with its tools 21 again whirls up the plastics material supplied to it from above in the form of the mixing cone 30. The number of tool carriers 22 disposed one above the other within the respective receptacle 1 or 2 depends on the field of operation considered. However, within each receptacle 1, 2 at least two tool carriers 22 should be provided one above the other.

It is suitable to bend or angle the disc edge 65 to above like a plate, because this favors creating an upwardly extending mixing cone and counteracts an early sinking down of the plastics particle through the gap existing between the disc edge and the receptacle wall.

If the apparatus is designed for processing already pre-comminuted plastics material, for example milled PET-bottles, then the tools 21 need not act in a comminuting manner, and they can be mere mixing tools that act to heat the processed material so that the kinetic power supplied to the tools mostly changes into heat power transferred into the material processed. However, if comminuting of the plastics material to be processed is required, then it is suitable to provide the tools 21 with cutting edges, in the manner of knives, whereby these cutting edges are so disposed that a drawing cut is obtained when the tools circulate (arrows 26).

As already mentioned, the temperature sensors 32 in the two receptacles 1, 2 are disposed higher than the respective tool carrier or the tools 21, respectively, in the mixing cone region of which the respective sensor 32 is disposed. In many cases a favorable height for disposal of the sensors is in the region in which the respective mixing cone 30 leaves the wall 31 of the receptacle 1 or 2, respectively.

The screw housings 28 or 48, respectively, must not be connected tangentially to the respective receptacle 1 or 2; also a radial disposal or a disposal in the manner of a secant with respect to the receptacle is possible. However, the tangential disposal has the advantage that the motor 35 or 64 driving the screw 29 or 47 can be disposed at the one front end of the respective screw, and the discharge end of the screw at the other front end of the respective screw housing. This avoids a lateral deviation of the material conveyed by the screw.

The invention claimed is:

1. Apparatus for processing thermoplastic synthetic material that has to be recycled, comprising a first and a second receptacle for the material to be processed, in which receptacles tools circulating around vertical axes are provided for mixing and heating the material, wherein at least two tools each circulate in different levels one above the other, and the material reaches the second receptacle that is connected to an evacuating means from the first receptacle through a connecting conduit, and wherein the first receptacle has above an intake opening for the material to be processed, which opening is disposed at a higher level than highermost tools circulating within this receptacle, and a discharge opening of the second receptacle is disposed at least substantially at the level of lowermost tools circulating in this receptacle, and a mouth of the connecting conduit in the second receptacle is disposed at a higher level than the tools circulating in this receptacle, and wherein the processed material is carried off the second receptacle through the discharge opening by means of at least one screw, whereby this receptacle is vacuum-tightly closed, and the first receptacle is also connected to an evacuating means, wherein to the intake opening of the first receptacle a sluice is connected and wherein in both receptacles the tools are mounted on disc-shaped tool carriers disposed one above the other, and wherein in each one of the two receptacles at least one temperature sensor is provided for each level of the circulating tools, which sensor is disposed higher than the level associated to it.

2. Apparatus according to claim 1, wherein the evacuating means is equipped for creating different vacuum conditions in the two receptacles and a transfer sluice is disposed in the connecting conduit.

3. Apparatus according to claim 2, wherein the evacuating means comprises at least one vacuum pump for each one of the receptacles.

4. Apparatus according to claim 1, wherein a control means for the vacuum within the respective receptacle is connected to each one of the receptacles, which control means adjustably controls the vacuum in the respective receptacle.

5. Apparatus according to claim 1, wherein on at least one of the tool carriers the disc edge is upwardly bent like a plate.

6. Apparatus according to claim 1, wherein the temperature sensors are connected to means for controlling the circulation of the tools.

7. Apparatus according to claim 1, wherein each one of the evacuating means comprises a dust separator.

8. Apparatus according to claim 1, wherein the screw constitutes a member of an extruder.

9. Apparatus according to claim 8, wherein a double screw extruder is connected to the discharge opening.

10. Apparatus according to claim 1, wherein to the discharge opening a housing of the screw is connected, which housing comprises at least one de-gassing opening.

11. Apparatus according to claim 1, wherein each temperature sensor is disposed within the receptacle at least substantially at a level that is in the region in which a mixing cone leaves the side wall of the receptacle.

12. Apparatus according to claim 1, wherein the sluice is a vacuum sluice.

13. Apparatus according to claim 1 wherein the mouth of the connecting conduit in the second receptacle is disposed at a higher level than an uppermost tool in the second receptacle.

14. Apparatus according to claim 10 including a vacuum pump connected to the degassing opening.

* * * * *